United States Patent [19]
Klopp

[11] Patent Number: 5,520,161
[45] Date of Patent: May 28, 1996

[54] EXHAUST GAS RECIRCULATION SYSTEM FOR A COMPRESSION IGNITION ENGINE AND A METHOD OF CONTROLLING EXHAUST GAS RECIRCULATION IN A COMPRESSION IGNITION ENGINE

[75] Inventor: Gerhard O. Klopp, Calgary, Canada

[73] Assignee: Alternative Fuel Sytems Inc., Calgary, Canada

[21] Appl. No.: 502,968

[22] Filed: Jul. 17, 1995

[51] Int. Cl.$^6$ .......................... F02D 41/14; F02M 25/07
[52] U.S. Cl. .......................... 123/676; 123/569; 123/571
[58] Field of Search .................................. 123/676, 568, 123/569, 571

[56] References Cited

U.S. PATENT DOCUMENTS

| | | | |
|---|---|---|---|
| 4,269,156 | 5/1981 | Drellishak | 123/676 |
| 4,279,235 | 7/1981 | Flaig et al. | 123/569 |
| 4,454,854 | 6/1984 | Gotoh et al. | 123/569 |
| 4,509,485 | 4/1985 | Hasegawa | 123/676 |
| 4,556,039 | 12/1985 | Kniss et al. | 123/569 |
| 4,562,821 | 1/1986 | Ikeda | 123/569 |
| 4,624,228 | 11/1986 | Sahara et al. | 123/569 |
| 4,683,857 | 8/1987 | Yasuoka | 123/676 |
| 4,825,841 | 5/1989 | Norota et al. | 123/676 |
| 5,188,087 | 2/1993 | Saito | 123/571 |
| 5,209,214 | 5/1993 | Ikuta et al. | 123/698 |
| 5,349,936 | 9/1994 | Uchinami | 123/676 |
| 5,427,083 | 6/1995 | Ahern | 123/676 |

*Primary Examiner*—Willis R. Wolfe
*Attorney, Agent, or Firm*—Pearne, Gordon, McCoy & Granger

[57] ABSTRACT

An exhaust gas recirculation system for a compression ignition engine and a method of controlling exhaust gas recirculation in compression ignition engines are disclosed. The method and apparatus are adapted to the control of exhaust gas recirculation in diesel and/or multifuel (e.g. diesel and natural gas) engines. The apparatus includes a first pressure sensor for sensing an absolute gas pressure in the intake manifold of the engine, a second pressure sensor for sensing an absolute gas pressure in the exhaust manifold of the engine, an engine speed sensor for detecting engine RPM, a fuelling rate sensor for detecting the commanded fuelling rate for the engine, a temperature sensor for detecting the temperature of intake air in the intake manifold, a conduit for directing exhaust gas from the exhaust manifold to the intake manifold, an electronically actuated mechanical valve in the conduit for controlling the flow of exhaust gas and an electronic controller for analyzing signals from the sensors and outputting control signals to an electric stepper motor which controls the position of the valve. The advantages include accurate control of exhaust gas recirculation in real time, rapid response to changing combustion conditions which result in reduced pollution emission and higher fuel efficiency. A further advantage is a system which is readily retrofit to an existing compression ignition engine or included as a part of original equipment in new engines without engine redesign.

23 Claims, 5 Drawing Sheets

|  | RPM | RPM | RPM | RPM | RPM | RPM | RPM | RPM | RPM |
|---|---|---|---|---|---|---|---|---|---|
| ΔP | VOL. EFF. | VOL. EFF. | VOL. EFF. | VOL. EFF. | VOL. EFF. | VOL. EFF. | VOL. EFF. | VOL. EFF. | VOL. EFF. |
| ΔP | VOL. EFF. | VOL. EFF. | VOL. EFF. | VOL. EFF. | VOL. EFF. | VOL. EFF. | VOL. EFF. | VOL. EFF. | VOL. EFF. |
| ΔP | VOL. EFF. | VOL. EFF. | VOL. EFF. | VOL. EFF. | VOL. EFF. | VOL. EFF. | VOL. EFF. | VOL. EFF. | VOL. EFF. |
| ΔP | VOL. EFF. | VOL. EFF. | VOL. EFF. | VOL. EFF. | VOL. EFF. | VOL. EFF. | VOL. EFF. | VOL. EFF. | VOL. EFF. |
| ΔP | VOL. EFF. | VOL. EFF. | VOL. EFF. | VOL. EFF. | VOL. EFF. | VOL. EFF. | VOL. EFF. | VOL. EFF. | VOL. EFF. |
| ΔP | VOL. EFF. | VOL. EFF. | VOL. EFF. | VOL. EFF. | VOL. EFF. | VOL. EFF. | VOL. EFF. | VOL. EFF. | VOL. EFF. |
| ΔP | VOL. EFF. | VOL. EFF. | VOL. EFF. | VOL. EFF. | VOL. EFF. | VOL. EFF. | VOL. EFF. | VOL. EFF. | VOL. EFF. |
| ΔP | VOL. EFF. | VOL. EFF. | VOL. EFF. | VOL. EFF. | VOL. EFF. | VOL. EFF. | VOL. EFF. | VOL. EFF. | VOL. EFF. |
| ΔP | VOL. EFF. | VOL. EFF. | VOL. EFF. | VOL. EFF. | VOL. EFF. | VOL. EFF. | VOL. EFF. | VOL. EFF. | VOL. EFF. |

FIG. 4

|  | RPM | RPM | RPM | RPM | RPM | RPM | RPM | RPM |
|---|---|---|---|---|---|---|---|---|
| fuelling rate | % EGR | % EGR | % EGR | % EGR | % EGR | % EGR | % EGR | % EGR |
| fuelling rate | % EGR | % EGR | % EGR | % EGR | % EGR | % EGR | % EGR | % EGR |
| fuelling rate | % EGR | % EGR | % EGR | % EGR | % EGR | % EGR | % EGR | % EGR |
| fuelling rate | % EGR | % EGR | % EGR | % EGR | % EGR | % EGR | % EGR | % EGR |
| fuelling rate | % EGR | % EGR | % EGR | % EGR | % EGR | % EGR | % EGR | % EGR |
| fuelling rate | % EGR | % EGR | % EGR | % EGR | % EGR | % EGR | % EGR | % EGR |
| fuelling rate | % EGR | % EGR | % EGR | % EGR | % EGR | % EGR | % EGR | % EGR |
| fuelling rate | % EGR | % EGR | % EGR | % EGR | % EGR | % EGR | % EGR | % EGR |
| fuelling rate | % EGR | % EGR | % EGR | % EGR | % EGR | % EGR | % EGR | % EGR |

FIG. 5

|  | RPM | RPM | RPM | RPM | RPM | RPM | RPM | RPM | RPM |
|---|---|---|---|---|---|---|---|---|---|
| fuelling rate | EXH. TEMP | EXH. TEMP | EXH. TEMP | EXH. TEMP | EXH. TEMP | EXH. TEMP | EXH. TEMP | EXH. TEMP | EXH. TEMP |
| fuelling rate | EXH. TEMP | EXH. TEMP | EXH. TEMP | EXH. TEMP | EXH. TEMP | EXH. TEMP | EXH. TEMP | EXH. TEMP | EXH. TEMP |
| fuelling rate | EXH. TEMP | EXH. TEMP | EXH. TEMP | EXH. TEMP | EXH. TEMP | EXH. TEMP | EXH. TEMP | EXH. TEMP | EXH. TEMP |
| fuelling rate | EXH. TEMP | EXH. TEMP | EXH. TEMP | EXH. TEMP | EXH. TEMP | EXH. TEMP | EXH. TEMP | EXH. TEMP | EXH. TEMP |
| fuelling rate | EXH. TEMP | EXH. TEMP | EXH. TEMP | EXH. TEMP | EXH. TEMP | EXH. TEMP | EXH. TEMP | EXH. TEMP | EXH. TEMP |
| fuelling rate | EXH. TEMP | EXH. TEMP | EXH. TEMP | EXH. TEMP | EXH. TEMP | EXH. TEMP | EXH. TEMP | EXH. TEMP | EXH. TEMP |
| fuelling rate | EXH. TEMP | EXH. TEMP | EXH. TEMP | EXH. TEMP | EXH. TEMP | EXH. TEMP | EXH. TEMP | EXH. TEMP | EXH. TEMP |
| fuelling rate | EXH. TEMP | EXH. TEMP | EXH. TEMP | EXH. TEMP | EXH. TEMP | EXH. TEMP | EXH. TEMP | EXH. TEMP | EXH. TEMP |
| fuelling rate | EXH. TEMP | EXH. TEMP | EXH. TEMP | EXH. TEMP | EXH. TEMP | EXH. TEMP | EXH. TEMP | EXH. TEMP | EXH. TEMP |

FIG. 6

| FLOW, DENSITY & PRESSURE DROP | VALVE POSITION |
|---|---|
| $Q_{egr}\sqrt{\frac{\rho_{exh}}{\Delta P}}$ | $\beta_0$ VALVE |
| $Q_{egr}\sqrt{\frac{\rho_{exh}}{\Delta P}}$ | $\beta_1$ VALVE |
| $Q_{egr}\sqrt{\frac{\rho_{exh}}{\Delta P}}$ | $\beta_2$ VALVE |
| $Q_{egr}\sqrt{\frac{\rho_{exh}}{\Delta P}}$ | $\beta_3$ VALVE |
| $Q_{egr}\sqrt{\frac{\rho_{exh}}{\Delta P}}$ | $\beta_4$ VALVE |
| $Q_{egr}\sqrt{\frac{\rho_{exh}}{\Delta P}}$ | $\beta_5$ VALVE |
| $Q_{egr}\sqrt{\frac{\rho_{exh}}{\Delta P}}$ | $\beta_6$ VALVE |
| $Q_{egr}\sqrt{\frac{\rho_{exh}}{\Delta P}}$ | $\beta_7$ VALVE |
| $Q_{egr}\sqrt{\frac{\rho_{exh}}{\Delta P}}$ | $\beta_8$ VALVE |

FIG. 7

| CLOCK COUNTS | VALVE POSITION (degrees) |
|---|---|
| $n_0$ | $\beta_0$ VALVE |
| $n_1$ | $\beta_1$ VALVE |
| $n_2$ | $\beta_2$ VALVE |
| $n_3$ | $\beta_3$ VALVE |
| $n_4$ | $\beta_4$ VALVE |
| $n_5$ | $\beta_5$ VALVE |
| $n_6$ | $\beta_6$ VALVE |
| $n_7$ | $\beta_7$ VALVE |
| $n_8$ | $\beta_8$ VALVE |

EXHAUST GAS RECIRCULATION SYSTEM FOR A COMPRESSION IGNITION ENGINE AND A METHOD OF CONTROLLING EXHAUST GAS RECIRCULATION IN A COMPRESSION IGNITION ENGINE

TECHNICAL FIELD

The present invention relates to exhaust gas recirculation in internal combustion engines as a pollution control strategy and, in particular, to an exhaust gas recirculation system for compression ignition engines.

BACKGROUND OF THE INVENTION

In the late 1950's, it was determined that internal combustion engine exhaust emissions were a significant contributor to the photochemical smoke and smog that enshrouded industrialized cities around the world. The damage to human health, animal life and the environment in general due to the effects of exhaust emissions have been widely studied and thoroughly documented. In order to reduce smog levels, governments have enacted legislation to control pollution emissions at their sources, including exhaust emissions from internal combustion engines.

Starting in the early 1960's, manufacturers of spark ignition (otto cycle) gasoline fuelled engines began installing the first rudimentary pollution abatement devices, some of which are still in use today. Over the years as automobile use has proliferated, government legislation has become more stringent with regard to otto cycle engine exhaust emission levels and the vehicle manufacturers have responded with more complicated equipment on their engines to comply with more stringent regulations. While the exhaust emissions of otto cycle engines have been strictly regulated, governments have largely ignored compression ignition engines (diesel engines) because those engines are more fuel efficient and have relatively lower emission levels than otto cycle engines without pollution control equipment. Another contributing factor was probably the much smaller number of diesel engines compared to the number of otto cycle engines in concurrent use.

As more was learned through research about the effects of exhaust emission caused pollution, governments legislated stricter controls of a broader range of such emissions. In the early 1980's, even diesel powered vehicle emissions began to be scrutinized and diesel engine manufacturers were forced to follow the suit of otto cycle powered vehicle manufacturers who applied a variety of increasingly complex strategies and apparatus in multi-pronged responses to government legislation regulating acceptable exhaust emission levels.

In the mid 1970's, otto cycle engine manufacturers developed a strategy for recycling a portion of the exhaust gases back into the intake manifold to subject that portion of recirculated exhaust to combustion conditions in order to control nitrogen oxides ($NO_x$), carbon monoxide (CO), and total hydrocarbon emissions (THC).

Exhaust gas recirculation (EGR), by the introduction of gases from the exhaust into the combustion cycle, causes lower combustion chamber temperatures, thus inhibiting the formation of $NO_x$ as well as promoting the oxidation of some of the previously unburned hydrocarbons. The control of the recirculation of exhaust gases is performed by EGR valves which are widely used on otto cycle engines and, to a much less extent, on diesel engines.

Until the early 1990's, EGR valves were pneumatically actuated and controlled and thus were not capable of precise monitoring or rapid response to varying engine speeds and loads. The pneumatic actuation and control method also induces inaccuracies in valve positioning and delays in response time due to changing barometric pressures in the surrounding atmosphere. In the early 1990's, EGR valves controlled by microprocessor based engine controllers using electric actuator motors were introduced for otto cycle engines.

A system for controlling the amount of recirculated exhaust gas for a diesel engine is also known and described by Ikeda in U.S. Pat. No. 4,562,821 which issued Jan. 7, 1986. In this system, an electronic controller senses engine speed, intake manifold pressure, fuelling rate, engine coolant temperature and combustion flame brightness in order to control exhaust gas recirculation in a diesel engine. The system has two principal shortcomings. First, an expensive combustion flame brightness detecting system is required by the strategy. The sensors are not readily retrofit to existing engines because a special adaptation of the engine is required. Furthermore, the system relies on a vacuum actuated EGR valve which as noted above is slow to respond to rapidly changing engine operating conditions.

Another approach to the reduction of diesel engine emissions has been the development of dual fuel and multifuel systems for replacing a portion of the diesel fuel normally burned in compression ignition engines with a lighter, cleaner burning gaseous fuel such as natural gas. Extensive research has shown that EGR's compatibility with dual/multifuel engines to be quite different from otto cycle engines. In dual/multifuel engines, optimal EGR can vary between 0% and more than 50%, and manifold pressure differentials are quite low. It has therefore become apparent that an otto cycle engine EGR system and strategy are unsuitable for use in compression ignition engines in general, and in dual/multifuel compression ignition engines in particular.

SUMMARY OF THE INVENTION

It is an object of the invention to provide an EGR system for compression ignition engines which enables accurate, real time control of the amount of exhaust gas recirculated to the engine.

It is a further object of the invention to provide an EGR system which is adapted to be retrofit to an existing compression ignition engine.

It is yet a further object of the invention to provide an EGR system which is adapted to be included as original equipment on a compression ignition engine without redesign of the engine architecture.

These and other objects are realized in an exhaust gas recirculation system for a compression ignition engine, comprising:

a first pressure sensor for sensing an absolute gas pressure in an intake manifold of the engine;

a second pressure sensor for sensing an absolute gas pressure in an exhaust manifold of the engine;

an engine speed sensor for detecting a rotational speed of the engine;

a fuelling rate sensor for detecting a fuelling rate for the engine;

an air charge temperature sensor for detecting a temperature of intake air in the intake manifold of the engine;

a conduit for providing a fluid passage between the exhaust manifold and the intake manifold, and an exhaust gas recirculation valve disposed in the conduit to regulate a flow of exhaust gas from the exhaust manifold to the intake manifold;

means for controlling the exhaust gas recirculation valve so that the flow of the exhaust gas through the conduit from the exhaust manifold to the intake manifold is regulated; and an electronic controller for receiving signals from the first and second pressure sensors, the engine speed sensor, the fuelling rate sensor and the air charge temperature sensor, computing an optimal ratio of exhaust gas to intake air based on the signals received, deriving a valve position that permits the optimal ratio of exhaust gas to intake air to flow through the conduit to the intake manifold, and actuating the means for controlling the exhaust gas recirculation valve to position the valve at the derived valve position to permit the optimal ratio of exhaust gas to intake air to flow through the conduit from the exhaust manifold to the intake manifold.

In accordance with a further aspect of the invention, there is provided a method for controlling exhaust gas recirculation in a compression ignition engine wherein rather than controlling % EGR directly, the method uses the mass flow rate of air as a function of engine speed and fuelling rate as its basic control variable and assumes that the mass flow rate of air should be roughly constant for a given engine speed/engine load combination, and applies EGR to maintain that mass flow rate of air at varying inlet and exhaust temperatures and pressures. In particular, there is provided a method of controlling the exhaust gas recirculation in a compression ignition engine comprising:

a) sensing a fuelling rate for the engine;

b) sensing a rotational speed of the engine;

c) sensing an exhaust manifold absolute pressure and an intake manifold absolute pressure of the engine and computing a pressure drop between the exhaust manifold and the intake manifold;

d) determining a volumetric efficiency of gas flow through the engine as a function of the rotational speed and the pressure drop;

e) determining a % EGR as a function of the rotational speed and the fuelling rate for the engine;

f) determining a temperature of gases in the exhaust manifold as a function of the rotational speed and the fuelling rate for the engine;

g) sensing an intake air temperature of air drawn into the intake manifold;

h) computing a fluid density of the exhaust gases based on the absolute pressure in the exhaust manifold, a molecular weight of the exhaust gases and the temperature of the exhaust gas;

h) computing a volumetric flow of exhaust gas through the EGR valve;

i) deriving a variable based on the volumetric flow of exhaust gas through the EGR valve, the fluid density of the exhaust gas and the pressure drop to locate a required EGR valve position; and j) moving the EGR valve to the required position.

The present invention therefore provides a relatively simple, electronically controlled recirculation system for compression ignition engines which uses standard commercially available components to provide an inexpensive pollution abatement device that may be retrofit to an existing compression ignition engine or provided as original equipment on new engines. The system includes an electronic engine controller, an engine intake manifold absolute pressure sensor, an engine exhaust manifold absolute pressure sensor, a fuelling rate sensor, an engine rotational speed sensor, and an air charge temperature sensor. The recirculation of exhaust gas is controlled by an electronically actuated EGR valve which is preferably a butterfly valve having a valve position sensor. The position of the valve is preferably controlled by an electronic stepper motor to ensure accurate, rapid response to changing engine loads and operating conditions.

As noted above, the invention also provides a novel method of controlling exhaust gas recirculation in compression ignition engines whereby an optimum % EGR is empirically derived under controlled test conditions so that a balance between maximum thermal efficiency and minimum pollutant emissions is achieved. The mass flow rate through the engine is then computed using the definition of % EGR and an air density that compensates for variations in ambient air temperature and barometric pressure. The mass flow rate is used to calculate the flow of EGR through the EGR valve so that the valve position can be adjusted to achieve the optimum % EGR. The appropriate valve position is derived using a function which yields a dimensionless number from the volumetric flow of exhaust gas through the EGR valve, the density of exhaust gas and the pressure drop from the exhaust manifold to the intake manifold. The dimensionless number is then used to locate the appropriate valve position in a two-dimensional table. The method of controlling the exhaust gas recirculation relies on the assumptions that:

1) both air and exhaust gas behave as ideal gas in the temperature/pressure ranges encountered in engine operation;

2) exhaust gas temperature for a specified engine speed/load condition changes negligibly with changing intake air temperature or barometric pressure;

3) volumetric efficiency is a function only of engine speed and pressure differential between the intake and exhaust manifolds;

4) the exhaust gas composition is adequately represented by $O_2$, $N_2$, $CO_2$, and $H_2O$ for calculating exhaust gas properties, since the concentrations of all other exhaust gas components are negligible; and 5) for multifuel engines, the influence of gaseous fuel on the molar mass of mixed air and exhaust gas in the intake manifold is negligible.

BRIEF DESCRIPTION OF THE DRAWINGS

The preferred embodiments of the invention will now be explained by way of example only and with reference to the following drawings, wherein:

FIG. 4 shows a table for determining volumetric efficiency as a function of engine speed and pressure drop between the exhaust manifold and the intake manifold of a compression ignition engine;

FIG. 5 shows a table for determining the % EGR as a function of engine speed and fuelling rate for a compression ignition engine;

FIG. 6 shows a table for determining exhaust gas temperature as a function of engine speed and fuelling rate in a compression ignition engine;

FIG. 7 shows a table for determining an EGR valve position as a function of exhaust gas flow, exhaust gas density and pressure drop between the exhaust manifold and the intake manifold of a compression ignition engine; and FIG. 8 shows a table for determining an EGR valve position as a function of electronic engine controller clock counts based on the output of a potentiometer for monitoring EGR valve position.

DETAILED DESCRIPTION OF THE PREFERRED EMBODIMENT

The apparatus and the method in accordance with the invention may be described in terms of a physical layout and hardware components, control logic, and calculation procedures. In order to facilitate a complete understanding of the invention, the detailed description of the preferred embodiment is organized accordingly.

Physical Layout and Hardware Components

Figure 1:
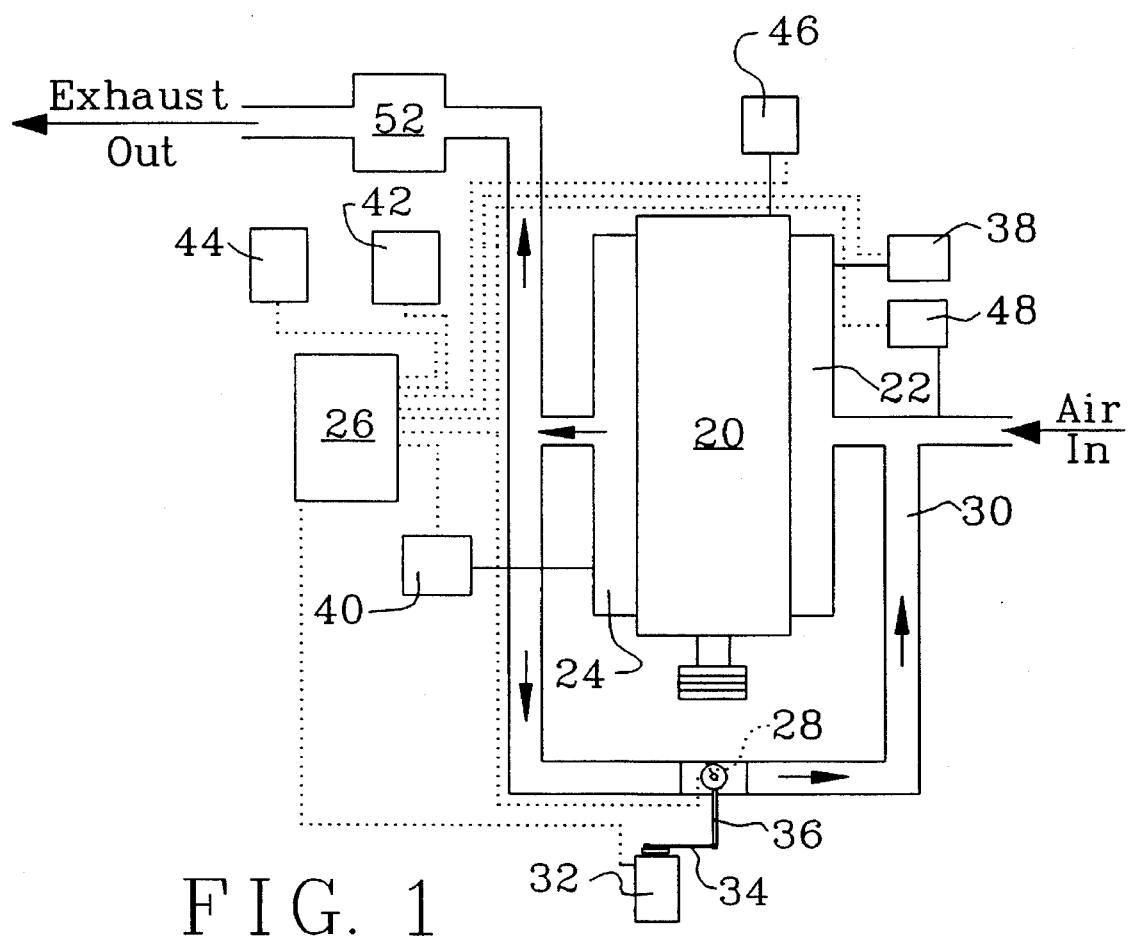
FIG. 1 is a schematic diagram of a compression ignition engine equipped with an exhaust gas recirculation system in accordance with the invention.

FIG. 1 shows a schematic diagram of a compression ignition engine 20 equipped with an exhaust gas recirculation system in accordance with the invention. The compression ignition engine 20 may be a diesel engine or a multifuel engine such as a diesel/natural gas engine, the construction of which is known in the art and is accordingly not explained in this document. The compression ignition engine 20 is equipped with an intake manifold 22 for supplying combustion air to the engine cylinders (not illustrated) and an exhaust manifold 24 for exhausting combustion gas from the cylinders of the compression ignition engine 20. The exhaust gas recirculation system (hereinafter referred to as an EGR system) is controlled by an electronic controller 26. The electronic controller 26 may be an electronic engine controller for controlling other operations of the compression ignition engine 20 as well as controlling the EGR system, or it may be an electronic controller dedicated to the function of controlling the EGR system in accordance with the invention. The electronic controller 26 is any one of a number of dedicated processors commercially available for engine control systems.

A primary function of the electronic engine, controller is to control the position of an EGR valve 28 which is located within an exhaust recirculation conduit 30 that interconnects the exhaust manifold 24 and the intake manifold 22. The EGR valve 28 will be explained in more detail with relation to FIG. 2. The EGR valve 28 includes a control linkage 36 which is connected to a motor linkage 34 that is pivotally connected to an electric stepper motor 32 that controls the rotational position of the EGR valve 28. In order to provide effective and optimal control of the EGR valve 28, a number of sensors are required for monitoring the operating conditions of the compression ignition engine 20. Those sensors include an intake manifold absolute pressure sensor 38 located in the intake manifold 22 and an exhaust manifold absolute pressure sensor 40 located in the exhaust manifold 24. If the compression ignition engine 20 is a multifuel engine, the system may include a fuel mode selector switch 42 for switching the engine from diesel only to a multifuel mode, for example, such as a diesel/natural gas fuel combination. The system also includes a fuelling rate sensor 44, typically a high resolution potentiometer which monitors the position of a fuel pedal, or some equivalent such as a throttle position sensor. The engine is also equipped with an engine rotation speed sensor 46 (hereinafter referred to as RPM sensor 46) for determining the rotational speed of the engine crank shaft. The RPM sensor 46 is preferably a Hall Effect sensor which may be attached to the diesel fuel injection pump of the compression ignition engine 20, a flywheel, or an output end of the crank shaft, as desired. The location of the RPM sensor 46 is not important so long as it provides a reliable indication of the rotational speed of the engine's crank shaft. The system also includes an air charge temperature sensor 48 which measures the temperature of combustion air drawn into the intake manifold 22. The exhaust system of the compression ignition engine 20 is also typically equipped with a catalytic converter 52 but the catalytic converter is ancillary to the exhaust gas recirculation system in accordance with the invention.

Figure 2:
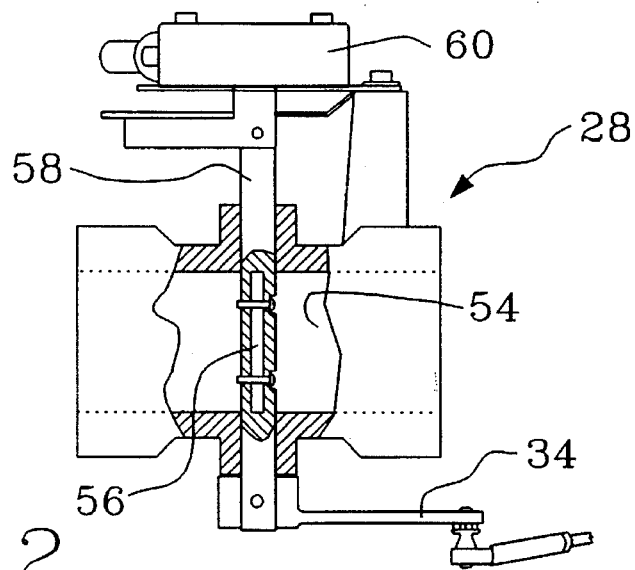
FIG. 2 is a partially cutaway side view of a preferred embodiment of an EGR valve for use in the exhaust gas recirculation system for a compression ignition engine shown in FIG. 1.

FIG. 2 shows a side elevational view of a partial cross-section through a preferred construction for the EGR valve 28 for use in the exhaust gas recirculation system in accordance with the invention. The EGR valve 28 includes a central passage 54 having a diameter preferably equal to or larger than the diameter of the exhaust recirculation conduit 30 (see FIG. 1). The central passage 54 may be closed by a butterfly valve 56 which is rotationally positioned by a valve shaft 58 that is connected on its lower end to the EGR valve linkage 34 and on its upper end to a high resolution potentiometer 60 of a type well known in the automotive industry. The high resolution potentiometer 60 is used to determine a rotational position of the butterfly valve 56 in a way that will be explained in detail below. The EGR valve 28 is preferably an electronically controlled butterfly valve because that construction provides a precise, rapid control response to changing combustion conditions in the compression ignition engine 20, as will also be explained in detail below.

Control Logic

Figure 3:
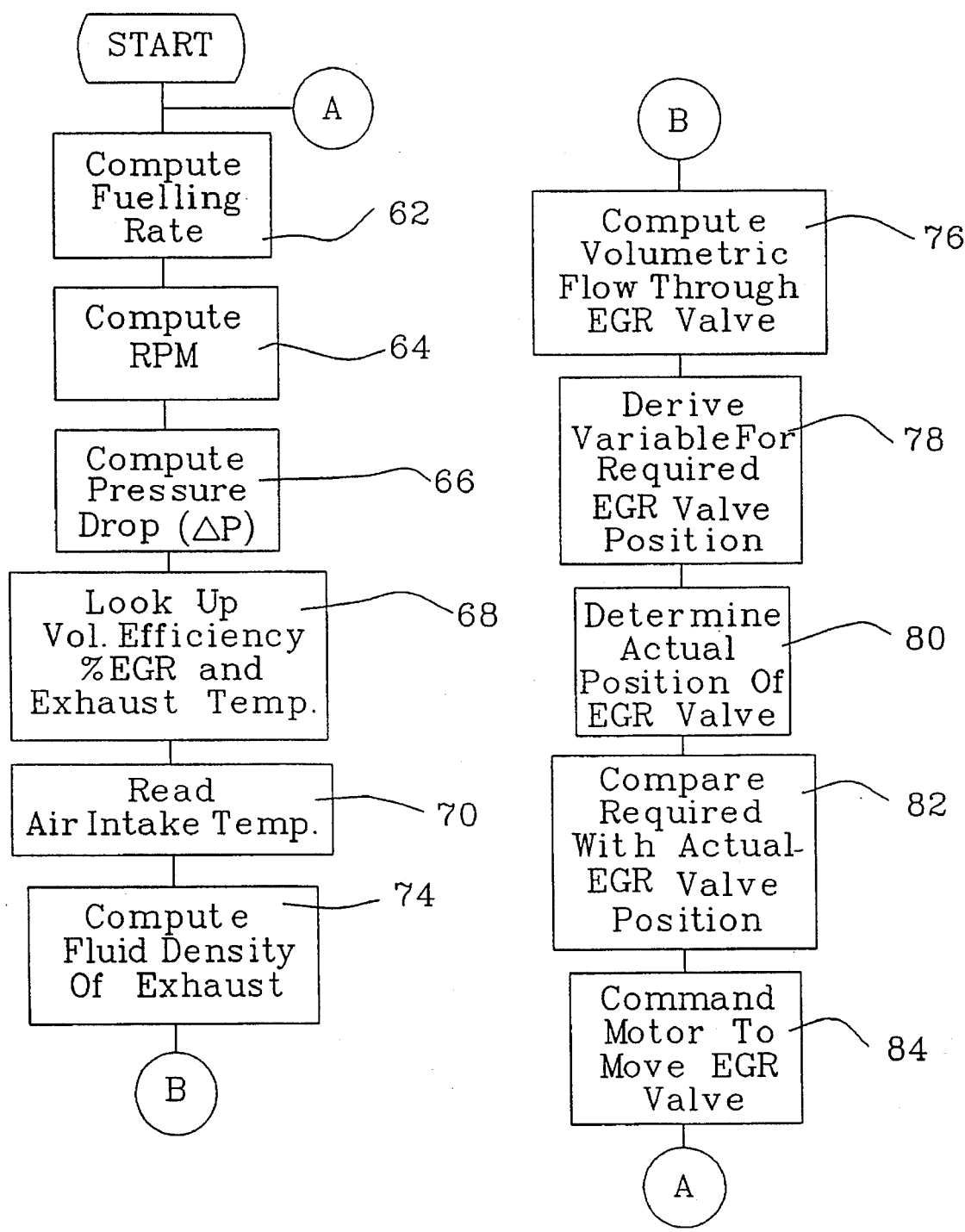
FIG. 3 is a logic diagram of the method of controlling the exhaust gas recirculation in a compression ignition engine in accordance with the invention.

FIG. 3 shows a flow diagram of the general control logic executed by the electronic engine controller 26 to control the position of the EGR valve 28 and thereby to control the amount of exhaust gas recirculated from the exhaust manifold 24 to the intake manifold 22. The controller executes a program loop which begins with determining a commanded fuelling rate from the fuelling rate sensor 44 and ends with orienting the butterfly valve 56 of the EGR valve 28 to a required orientation for providing an optimum exhaust gas recirculation to the intake manifold 22. The control logic will now be explained in detail.

As shown in FIG. 3, the process begins with a step 62 in which a commanded fuelling rate for the compression ignition engine 20 is determined by analyzing input signals from the fuelling rate sensor 44.

In step 64, the electronic controller 26 computes the engine rotational speed by analyzing output signals from an RPM sensor 46, preferably a Hall Effect sensor (not illustrated) attached to a diesel fuel injection pump of the engine (also not illustrated) which runs at one-half the engine speed for a 4 stroke engine. In step 66, the electronic engine controller 26 reads the input signals from the exhaust manifold absolute pressure sensor 40 and the intake manifold absolute pressure sensor 38 and computes a pressure drop ($\Delta P$) in accordance with the following formula:

ΔP = Absolute Pressure − Absolute Pressure
      Exhaust Manifold (kPa)   Intake Manifold (kPa)

In step 68, the results of steps 62–66 are used to determine the volumetric efficiency, % EGR, and exhaust gas temperature from tables of data empirically derived from engine testing using a compression ignition engine monitored with a dynamometer in a manner well known in the art.

FIG. 4 shows the structure of a table used to retrieve the volumetric efficiency of the engine as a function of engine speed and the pressure drop (ΔP). The table in accordance with the preferred embodiment is arranged in rows of respectively assigned values for ΔP and columns of respectively assigned values for RPM. The values respectively assigned to each row and each column of FIG. 4 may be incremental, but are not necessarily expressed in even increments. The assigned value will depend on the particular engine model to be equipped with EGR and may be clustered around particular engine speeds for finer resolution and better control in a particular operating speed range in order to meet a particular emissions standard. It should also be understood that the size of the table of FIG. 4, as shown, is illustrative only, the actual size of table required being dictated by the performance characteristics to be achieved. The data in FIG. 4 is empirically derived based on a mathematical definition of the volumetric efficiency of the engine, given by the formula:

$$\eta_{vol} = \frac{Q_{tot}}{RPM * V_{disp} * \frac{min}{60 \, sec} * \frac{intake \, stroke}{2 \, rev}}$$

wherein $\eta_{vol}$ is the volumetric efficiency of the engine, $Q_{tot}$ is the total volumetric flow through the intake manifold in liters per second, RPM is the crank shaft rotational speed of the engine and $V_{disp}$ is the engine displacement volume in liters. Because there is only one intake stroke for each two crank shaft revolutions in a four cycle compression ignition engine, the number of intake strokes is divided by 2.

Given this definition and the fact that the mixed temperature of air, exhaust gas and gaseous fuels in a multifuel engine cannot be measured accurately, the data used to complete the table shown in FIG. 4 is preferably obtained from an engine operating in diesel only mode without EGR. When the engine is operating in diesel only mode on a test stand, $Q_{tot} = Q_{air}$ and $Q_{air}$ is measured with a gas flow meter. RPM is measured and the equation is solved for $\eta_{vol}$ to obtain the volumetric efficiency for each cell in the FIG. 4.

The % EGR is derived from the table shown in FIG. 5 where % EGR is expressed as a function of engine rotational speed and fuelling rate. The data in this table is likewise preferably empirically derived from dynamometer testing of a test engine, based on the mathematical definition of % EGR expressed by the formula:

$$\% \, EGR = \left(1 - \frac{Q_{air} + Q_{gas}}{Q_{tot}}\right) * 100\%$$

where $Q_{air}$ is the volumetric flow of air into the engine at a given air temperature and intake manifold pressure, $Q_{gas}$ is the volumetric flow of gaseous fuel into the engine if the compression ignition engine 20 is a multifuel engine, and $Q_{tot}$ is the total volumetric flow through the intake manifold.

With the engine running on a test stand, the EGR valve 28 is positioned so that a balance between maximum thermal efficiency and minimum pollutant emissions is achieved. $Q_{gas}$ can be determined from the commanded fuel rate, $Q_{tot}$ is known and can be derived from FIG. 4, and $Q_{air}$ can be measured using a gas flow meter. % EGR is then calculated to complete the data in FIG. 5.

Exhaust gas temperature is derived from the table shown in FIG. 6 where exhaust gas temperature is expressed as a function of engine rotational speed and fuelling rate. The temperatures are expressed in °C and are empirically derived on test engines from actual temperature measurements after a desired % EGR at a given RPM and fuelling rate has been established. The temperatures derived from the tables shown in FIG. 6 must be converted to degrees Kelvin before being used in calculations for computing fluid density of the exhaust gas and volumetric flow of exhaust gas as will be explained below.

All incremental intervals in the tables shown in FIGS. 4–6 and all data in the tables are engine model specific and are empirically derived during dynamometer test runs on each particular model. Furthermore, the electronic controller 26 is programmed to perform two dimensional linear interpolation where sensor values fall between discrete values loaded in the tables. This permits precise response to operating conditions while limiting the amount of memory required to store the tables.

In step 70 of FIG. 3, the electronic controller 26 reads the air intake temperature using the air charge temperature sensor 48.

In step 74, the fluid density of the exhaust gas is computed based on the absolute pressure in the exhaust manifold, the molecular weight of the exhaust gas, the gas law constant and the exhaust gas temperature from the table shown in FIG. 6 using the formula:

$$\rho_{exh} = \frac{P_{exh} * MW_{exh}}{R * T_{exh}}$$

wherein $\rho_{exh}$ represents the fluid density of the exhaust gas, $P_{exh}$ represents the absolute pressure in the exhaust manifold, $MW_{exh}$ represents the molecular weight of the exhaust gas, R is the gas law constant (8.3144 kmol/kg.K) and $T_{exh}$ is the exhaust gas temperature derived from the table shown in FIG. 6.

In step 76, the electronic controller uses fluid density ($\rho_{exh}$) and pressure drop (ΔP) to compute the volumetric flow ($Q_{egr}$) of the exhaust gas through the EGR valve 28 using the formula:

$$Q_{egr} = \frac{(\dot{m}_{tot} - \dot{m}_{air} - \dot{m}_{gas}) * R * T_{exh}}{P_{exh} * MW_{exh}}$$

wherein $Q_{egr}$ represents the volumetric flow of exhaust gas through the EGR valve, $\dot{m}_{tot}$ is the total mass flow of gases through the intake manifold, $\dot{m}_{air}$ is the mass flow of air through the intake manifold, $\dot{m}_{gas}$ is the mass flow of gaseous fuel through the intake manifold of a multifuel engine, R is the gas law constant, $T_{exh}$ is the temperature of exhaust gas derived from the Table shown in FIG. 6, $P_{exh}$ is the absolute pressure in the exhaust manifold 24 and $MW_{exh}$ is the molecular weight in g/mol of the exhaust gas in the exhaust manifold 24. All of the variables on the right hand side of this equation are known except for $\dot{m}_{air}$, $\dot{m}_{tot}$ and $MW_{exh}$. For a detailed explanation of how $\dot{m}_{tot}$ and $MW_{exh}$ see the section on calculation procedures which follows.

The volumetric flow of air ($Q_{air}$) is calculated using the following formula:

$$Q_{air} = \left(1 - \frac{\%EGR}{100\%}\right) * \eta_{vol} * RPM * V_{disp} * \frac{min}{60\ sec} * \frac{intake\ stroke}{2\ rev} - \dot{m}_{gas} \frac{8.3144 T_{gas}}{16.04 P_{intake}}$$

The resulting $Q_{air}$ is, however, referenced to the air temperature $(T_{air})_{cal}$ and intake manifold pressure $(P_{intake})_{cal}$ at which % EGR was specified. The required air mass flow is therefore derived by multiplying the volumetric air flow from this equation by the air density calculated using the gas law constant (with $MW_{air}=28.97$), wherein $$\dot{m}_{air} = Q_{air} * \frac{(P_{intake})_{cal}}{0.287 * (T_{air})_{cal}}.$$

With the air mass flow calculated in this manner, the air mass flow does not vary with fluctuations in barometric pressure or intake air temperature. Since the fuel mass flow to the engine is unaffected by fluctuations in ambient temperature and pressure, the optimum amount of air will always be supplied for the complete combustion of all the injected fuel.

In step 78 of FIG. 3, a variable is derived to determine the required position of the EGR valve using the function:

$$Q_{egr} \sqrt{\frac{\rho_{exh}}{\Delta P}}$$

$Q_{egr}$, the volumetric flow of EGR is known from the calculation performed above, $\rho_{exh}$ is also known from the calculation performed above, and $\Delta P$ is computed by deducting the intake manifold absolute pressure from the exhaust manifold absolute pressure as described above. The dimensionless member derived from this function is used to locate a valve position ($\beta$valve) in FIG. 7.

In step 80, the current position of the EGR valve 28 is determined by measuring clock counts accumulated by the electronic engine controller in response to the potentiometer signal from the high resolution potentiometer 60 associated with the valve shaft 58 of the EGR valve 28. The table shown in FIG. 8 illustrates the relationship between the clock counts and the shaft position in degrees from a fully closed position with respect to the central passage 54 of the EGR valve 28. After the current position of the EGR valve is determined, the required position of the EGR valve determined in step 78 by referencing the table shown in FIG. 8 is compared with the current position of the EGR valve and a correction factor is computed. In step 84, the electronic controller 26 commands the electric stepper motor 32 to move the EGR valve 28 from its current position to the required position, if the current position is not the same as the required position determined in step 78. The program then returns to step 62 and the process is repeated. The frequency of executing this process depends on a number of factors, including other tasks performed by the electronic controller 26. Typically, the process is repeated every 4–12 milliseconds, ensuring that the EGR valve 28 is always optimally positioned and in tune with changing operating conditions.

Calculation Procedures

The calculations required to determine the total mass flow of gases through the engine, the molecular weight of the exhaust gas and the specific heats of the exhaust gas components are explained below. In order to facilitate an understanding of the calculations, the variables used are defined as follows:

$\dot{m}_{air}$=air mass flow into the engine
$\dot{m}_{egr}$=mass flow of exhaust gas through the EGR valve (g/s)
$\dot{m}_{gas}$=gaseous fuel mass flow into the engine
$\dot{m}_{dsf}$=diesel fuel mass flow into the engine
$\dot{m}_{tot}$=total mass flow through the intake manifold
$T_{air}$=air temperature in intake manifold just upstream of mixing point
$T_{exh}$=exhaust gas temperature
$T_{gas}$=gaseous fuel temperature as it enters the intake manifold
$T_{mix}$=mixed temperature of air, exhaust gas and gaseous fuel
$P_{intake}$=intake manifold absolute pressure
$P_{exh}$=exhaust manifold absolute pressure
R=gas law constant 8.33144 kmol/kg.K
$Q_{air}$=volumetric flow of air into the engine at $T_{air}$ and $P_{intake}$ (l/s)
$Q_{gas}$=volumetric flow of gaseous fuel into the engine at $T_{air}$ and $P_{intake}$ (l/s)
$Q_{tot}$=total volumetric flow through the intake manifold at $T_{air}$ and $P_{intake}$ (l/s)
$V_{disp}$=engine displacement volume (l/s)
MW=Molecular weight (g/mol)
h=enthalpy (kJ/kg.K)
$C_p$=specific heat (kJ/kg.K)

Calculation of Total Mass Flow:

The total mass flow ($\dot{m}_{tot}$) is derived as a result of multiplying the total volumetric flow ($Q_{tot}$), by the density ($\rho_{intake}$) of the mixture of the air, exhaust gas and gaseous fuel (in the case of a multifuel engine) at the mixed temperature and intake manifold pressure, $$\dot{m}_{tot} = Q_{tot} * \rho_{intake}$$

wherein the density $\rho_{intake}$, can be calculated using the gas law constant, as follows:

$$\rho_{intake} = \frac{P_{intake} * MW_{mix}}{R * T_{mix}}$$

where $MW_{mix}$ is approximated by 28.5 kg/kmol. To calculate the mixed temperature, $T_{mix}$, the first law of thermodynamics is required. The first law of thermodynamics for the mixing process is:

$$\dot{m}_{air} * h_{air} + \dot{m}_{egr} * h_{egr} + \dot{m}_{gas} * h_{gas} = \dot{m}_{tot} * h_{tot}$$

but for an ideal gas $h = C_p * T$ such that this equation becomes $$\dot{m}_{air} * (C_p)_{air} * T_{air} + \dot{m}_{egr} * (C_p)_{exh} * T_{exh} + \dot{m}_{gas} * (C_p)_{gas} * T_{gas} = \dot{m}_{tot} * (C_p)_{mix} * T_{mix}$$

The specific heats of air and gaseous fuels are assumed to be constant at 1.0035 kJ/kg.K for air and 2.2537 kJ/kg.K for gas (e.g. methane for multifuel engines). The specific heat of the exhaust gas, however, will vary with the exhaust gas composition and temperature. The calculation of the exhaust gas specific heat and molecular weight based on combustion stoichiometry is explained below. The specific heat of the mixture is a mass average of the specific heats of air, exhaust gas, and gas natural derived from:

$$(C_p)_{mix} = \frac{(C_p)_{air} * \dot{m}_{air} + (C_p)_{exh} * \dot{m}_{egr} + (C_p)_{gas} * \dot{m}_{gas}}{\dot{m}_{tot}}$$

Combining the five equations given above and rearranging yields:

$$((C_p)_{exh}*(\dot{m}_{air} + \dot{m}_{gas}) - (C_p)_{air}*\dot{m}_{air} - (C_p)_{gas}*\dot{m}_{gas})*T^2_{mix} +$$

$$(\dot{m}_{air}*(C_p)_{air}*T_{air} + \dot{m}_{gas}*(C_p)_{gas}*T_{gas} -$$

$$(\dot{m}_{air} + \dot{m}_{gas})*(C_p)_{exh}*T_{exh})*T_{mix} +$$

$$\left( (C_p)_{exh}*Q_{tot}*\frac{P_{intake}*MW_{mix}}{R} \right)*T_{mix} +$$

$$Q_{tot}*\frac{P_{intake}*MW_{mix}}{R}*(C_p)_{exh}*T_{exh} = 0$$

This equation is a quadratic expressed in $T_{mix}$ of the form:

$$a*T^2_{mix} + b*T_{mix} + c = 0$$

with a solution by the quadratic formula of:

$$T_{mix} = \frac{-b \pm \sqrt{b^2 - 4ac}}{2a}$$

Once the mixed temperature, $T_{mix}$ is known, then the mixed density, $\rho_{intake}$, can be calculated from the equation:

$$\rho_{intake} = \frac{P_{intake}*MW_{mix}}{R*T_{mix}}$$

and used in the equation:

$$\dot{m}_{tot} = Q_{tot}*\rho_{intake}$$

to calculate the total mass flow, $\dot{m}_{tot}$.

Calculation of Molecular Weights and Specific Heat:

The optimal ratios of recirculated exhaust gas to intake air, exhaust gas compositions, molecular weight and specific heat required to determine the volumetric flow, $Q_{egr}$, of exhaust gas through the EGR valve are determined by representing diesel fuel as $CH_{1.9}$, wherein the stoichiometric combustion of diesel fuel and air is written as:

$$CH_{1.9} + 7.024(0.21 O_2 + 0.79 N_2) \rightarrow CO_2 + 0.95 H_2O + 5.549 N_2$$

On a mass basis, this combustion reaction is written as:

$$1 kg CH_{1.9} + 3.39 kg O_2 + 11.16 kg N_2 \rightarrow 3.16 kg CO_2 + 1.23 kg H_2O + 11.16 kg N_2$$

For multifuel engines which burn natural gas, for example, as well as diesel, the natural gas may be represented as 100% methane ($CH_4$), the stoichiometric combustion of natural gas in air is written as:

$$CH_4 + 9.524(0.21 O_2 + 0.79 N_2) \rightarrow CO_2 + 2 H_2O + 7.52 N_2$$

On a mass basis, this combustion reaction is written as:

$$1 kg CH_4 + 3.99 kg O_2 + 13.14 kg N_2 \rightarrow 2.74 kg CO_2 + 2.25 kg H_2O + 13.14 kg N_2$$

Based on the above stoichiometry, the optimal ratio of recirculated exhaust gas to intake air $\phi$, is given by:

$$\phi = \frac{3.39 \dot{m}_{dsl} + 3.99 \dot{m}_{gas}}{0.233 \dot{m}_{air}}$$

Let $x_i$ and $y_i$ be the mass and mole fractions, respectively, of constituent i. Based on the above stoichiometry, the mass fractions of each constituent in the exhaust are then given by:

$$x_{CO_2} = \frac{3.16 \dot{m}_{dsl} + 2.74 \dot{m}_{gas}}{\dot{m}_{air} + \dot{m}_{dsl} + \dot{m}_{gas}}$$

$$x_{H_2O} = \frac{1.23 \dot{m}_{dsl} + 2.25 \dot{m}_{gas}}{\dot{m}_{air} + \dot{m}_{dsl} + \dot{m}_{gas}}$$

$$x_{N_2} = \frac{0.767 \dot{m}_{air}}{\dot{m}_{air} + \dot{m}_{dsl} + \dot{m}_{gas}}$$

$$x_{O_2} = \frac{0.233 \dot{m}_{air} - 3.39 \dot{m}_{dsl} - 3.99 \dot{m}_{gas}}{\dot{m}_{air} + \dot{m}_{dsl} + \dot{m}_{gas}}$$

The mole fraction of each constituent is given $$y_i = \frac{\frac{x_i}{MW_i}}{\Sigma \frac{x_i}{MW_i}}$$

The molecular weight of the exhaust gas is given by:

$$MW_{exh} = \Sigma y_i MW_i$$

The specific heat of the exhaust gas is given by:

$$(C_p)_{exh} = \Sigma \frac{y_i (\overline{C_p})_i}{MW_{exh}}$$

wherein $(C_p)_i$ is the constant-pressure specific heat in units kJ/kmol.K for each exhaust constituent as follows:

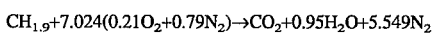

$(\overline{C_p})_{CO_2} = -3.7357 + 30.529\theta^{0.5} - 4.1034\theta + 0.024198\theta^2$

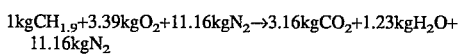

$(\overline{C_p})_{H_2O} = 143.05 - 183.54\theta^{0.25} + 82.751\theta^{0.5} + 3.6989\theta$

$(\overline{C_p})_{N_2} = 39.060 - 512.79\theta^{-1.5} + 1072.7\theta^{-2} - 820.40\theta^{-3}$

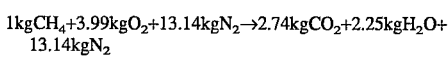

$(\overline{C_p})_{O_2} = 37.432 + 0.020102\theta^{1.5} - 178.57\theta^{-1.5} + 236.88\theta^{-2}$ where $$\theta = \frac{T_{exh}}{100}$$

with $T_{exh}$ in degrees Kelvin.

These calculation procedures permit the electronic controller 26 to accurately compensate for changes in ambient temperature and barometric pressure to ensure that an optimal ratio of recirculated exhaust gas to intake air is maintained under all operating conditions.

Industrial Applicability

The EGR system in accordance with the invention significantly reduces the level of the principal pollutants in compression ignition engines, namely nitrogen oxides ($NO_x$) and carbon monoxide (CO). When these oxides combine with water present in the atmosphere, they form various acids which are extremely corrosive to organic and inorganic matter. Those acids are contributors to the acid rain problem and $NO_x$ is also a major factor in the formation of photochemical smog and ground level ozone.

The EGR system in accordance with the invention also enhances hydrocarbon combustion and therefore promotes greater fuel efficiency. At low engine load conditions, the EGR system helps maintain the air/fuel ratio in a more efficient range without resorting to energy robbing air intake throttle of the engine. As well, "seeding" the air/fuel mixture with hot exhaust gas containing active chemical radicals promotes faster, more complete combustion thus lowering levels of unburned total hydrocarbons in the exhaust gas. Furthermore, the EGR system in accordance with the invention raises the exhaust temperature of the engine somewhat due to the displacement of cold intake air with hot exhaust gas, resulting in earlier activation and more efficient operation of any noble metal exhaust catalyst attached to the engine's exhaust system. Better operation of the catalyst promotes more efficient removal of pollutants from the exhaust stream such as carbon monoxide and total hydrocarbons.

Because the EGR valve 28 is electronically actuated, rather than pneumatically controlled, the system provides for high speed, accurate response to varying engine loads. The electronic controller 26 also provides a precise determination of optimum exhaust gas recirculation rates and extremely precise positioning of the EGR valve 28. Because the system provides precise variable positioning of the EGR valve 28, the engine responds with rated power under all operating conditions and the undesirable effects of black smoke and/or engine stalling due to the introduction of too much recirculated exhaust gas, which was a common problem with prior art EGR control systems, are eliminated.

It will be understood by those skilled in the art that changes and modifications to the above-described preferred embodiment can be made without departing from the spirit of the invention. The scope of the invention is therefore intended to be limited solely by the scope of the appended claims.

I claim:

1. An exhaust gas recirculation system for a compression ignition engine, comprising:

a first pressure sensor for sensing an absolute gas pressure in an intake manifold of the engine;

a second pressure sensor for sensing an absolute gas pressure in an exhaust manifold of the engine;

an engine speed sensor for detecting a rotational speed of the engine crank shaft;

a fuelling rate sensor for detecting a fuelling rate for the engine;

an air charge temperature sensor for detecting a temperature of intake air in the intake manifold of the engine;

a conduit for providing a fluid passage between the exhaust manifold and the intake manifold, and an exhaust gas recirculation valve disposed in the conduit to regulate a flow of exhaust gas from the exhaust manifold to the intake manifold;

means for controlling the exhaust gas recirculation valve so that the flow of the exhaust gas through the conduit from the exhaust manifold to the intake manifold is regulated; and an electronic controller for receiving signals from the first and second pressure sensors, the engine speed sensor, the fuelling rate sensor and the air charge temperature sensor, computing an optimal ratio of the exhaust gas to be recirculated to intake air based on the signals received and computing a valve position that permits the optimal ratio of exhaust gas to intake air to flow through the conduit to the intake manifold, and actuating the means for controlling the exhaust gas recirculation valve to position the valve at the computed valve position to permit the optimal ratio of exhaust gas to intake air to flow through the conduit from the exhaust manifold to the intake manifold.

2. An exhaust gas recirculation system for a compression ignition engine as claimed in claim 1, wherein the engine speed sensor is a Hall Effect sensor which is attached to an output shaft of a fuel pump of the engine.

3. An exhaust gas recirculation system for a compression ignition engine as claimed in claim 1, wherein the fuelling rate sensor is a high resolution potentiometer that measures a pedal position of a fuel pedal for the engine.

4. An exhaust gas recirculation system for a compression ignition engine as claimed in claim 1, wherein the exhaust gas recirculation valve is a mechanically controlled butterfly valve having a mechanical linkage for moving the butterfly valve from a fully closed to a fully open position.

5. An exhaust gas recirculation system for a compression ignition engine as claimed in claim 4, wherein the means for controlling the exhaust gas recirculation valve is an electric stepper motor operably connected to the mechanical linkage.

6. An exhaust gas recirculation system for a compression ignition engine as claimed in claim 5, wherein the butterfly valve is associated with a high resolution potentiometer for indicating a current position of the butterfly valve with respect to the fully closed position.

7. An exhaust gas recirculation system for a compression ignition engine as claimed in claim 6, wherein the electronic controller accumulates a count based on an output signal of the high resolution potentiometer and the count is used to determine the current position of the butterfly valve with respect to the fully closed position.

8. An exhaust gas recirculation system for a compression ignition engine as claimed in claim 1, wherein the compression ignition engine is a diesel engine.

9. An exhaust gas recirculation system for a compression ignition engine as claimed in claim 1, wherein the compression ignition engine is a dual fuel engine.

10. An exhaust gas recirculation system for a compression ignition engine as claimed in claim 9, wherein the compression ignition engine is a dual fuel engine equipped to operate with diesel and natural gas as fuels.

11. An exhaust gas recirculation system for a compression ignition engine as claimed in claim 1, wherein the compression ignition engine is a multifuel engine.

12. An exhaust gas recirculation system for a compression ignition engine as claimed in claim 10, wherein the compression ignition engine is a multifuel engine equipped to operate with diesel, natural gas and hydrogen as fuels.

13. A method of controlling exhaust gas recirculation in a compression ignition engine, comprising:

a) sensing a fuelling rate for the engine;

b) sensing a rotational speed of the engine;

c) sensing an exhaust manifold absolute pressure and an intake manifold absolute pressure of the engine and computing a pressure drop between the exhaust manifold and the intake manifold;

d) determining a volumetric efficiency of gas flow through the engine as a function of the rotational speed and the pressure drop;

e) determining a % EGR as a function of the rotational speed and the fuelling rate for the engine;

f) determining a temperature of gases in the exhaust manifold as a function of the rotational speed and the fuelling rate for the engine;

g) sensing an intake air temperature of air drawn into the intake manifold;

h) computing a fluid density of the exhaust gas based on an absolute pressure in the exhaust manifold, a molar mass of the exhaust gas and the temperature of the exhaust gas;

h) computing a volumetric flow of exhaust gas through the EGR valve;

i) deriving a variable based on the volumetric flow, the fluid density of the exhaust gas and the pressure drop to locate a required EGR valve position; and j) moving the EGR valve to the required position.

14. A method of controlling exhaust gas recirculation in a compression ignition engine as claimed in claim 13, wherein the volumetric efficiency of gas flow through the engine is determined by a table look-up of data empirically derived from dynamometer testing of the compression ignition engine.

15. A method of controlling exhaust gas recirculation in a compression ignition engine as claimed in claim 13, wherein the % EGR is determined by a table look-up of data empirically derived from operational testing of the compression ignition engine.

16. A method of controlling exhaust gas recirculation in a compression ignition engine as claimed in claim 13, wherein the temperature of gas in the exhaust manifold is determined by a table look-up of data empirically derived from operational testing of the compression ignition engine.

17. A method of controlling exhaust gas recirculation in a compression ignition engine as claimed in claim 13, wherein the required EGR valve position is derived from a table look-up of valve positions as a function of the variable.

18. A method of controlling exhaust gas recirculation in a compression ignition engine as claimed in claim 13, wherein the method further includes the steps of:

a) determining a current position of the EGR valve:

b) comparing the current position of the EGR valve with the required position of the EGR valve;

c) deriving a difference between the current position and the required position; and d) actuating a means for controlling a position of the EGR valve to move the EGR valve an equivalent of the derived difference between the current and the required position.

19. A method of controlling exhaust gas recirculation in a compression ignition engine as claimed in claim 13, wherein the compression ignition engine is a diesel engine.

20. A method of controlling exhaust gas recirculation in a compression ignition engine as claimed in claim 13, wherein the compression ignition engine is a dual fuel engine.

21. A method of controlling exhaust gas recirculation in a compression ignition engine as claimed in claim 20, wherein the compression ignition engine is a dual fuel engine adapted to use diesel and natural gas as fuels.

22. A method of controlling exhaust gas recirculation in a compression ignition engine as claimed in claim 13, wherein the compression ignition engine is a multifuel engine.

23. A method of controlling exhaust gas recirculation in a compression ignition engine as claimed in claim 22, wherein the compression ignition engine is a multifuel engine adapted to use diesel, natural gas and hydrogen as fuels.

* * * * *